No. 813,854. PATENTED FEB. 27, 1906.
H. BURLICH.
ROTARY ENGINE.
APPLICATION FILED JULY 28, 1905.
3 SHEETS—SHEET 1.
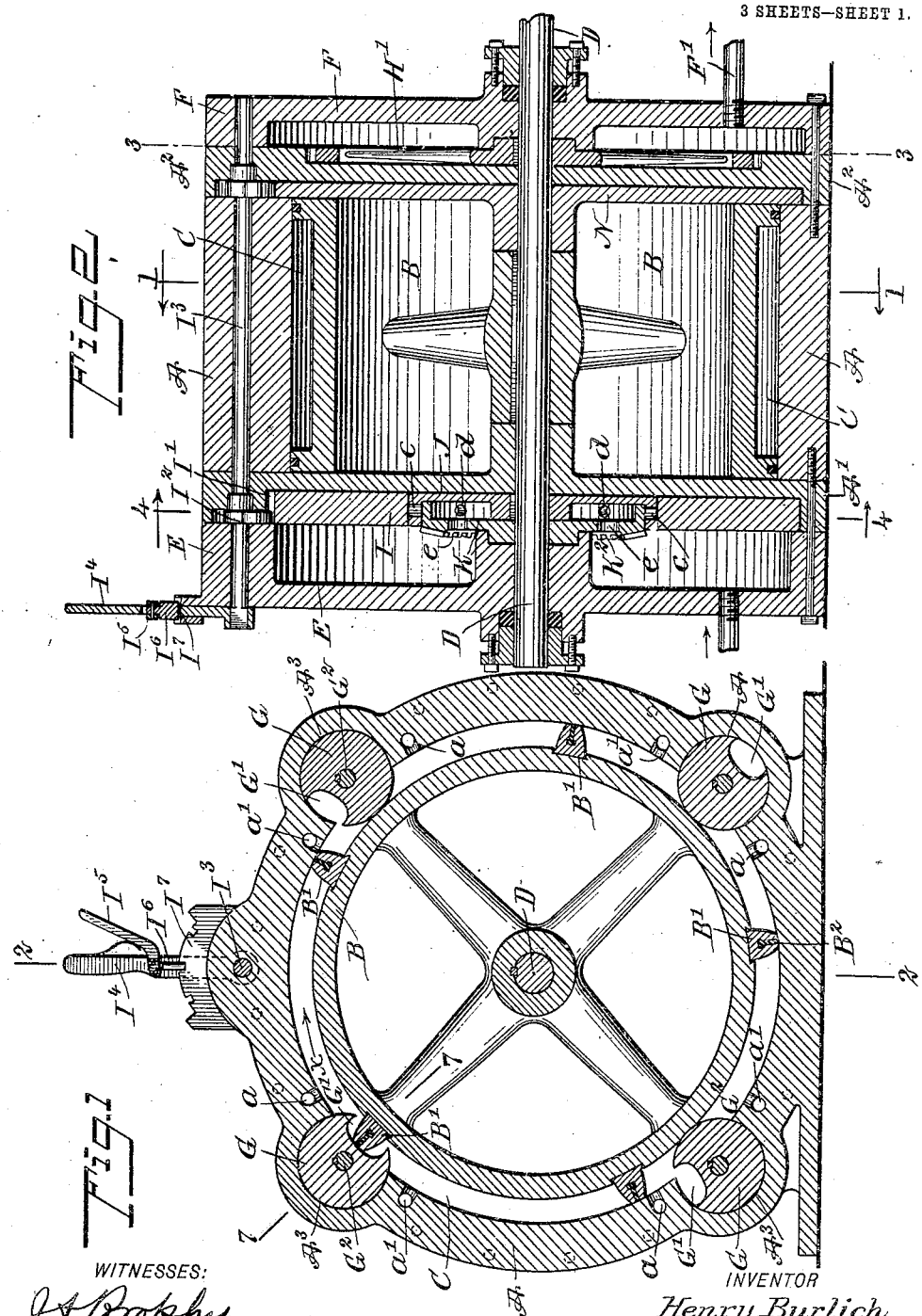
WITNESSES:
INVENTOR
Henry Burlich
BY
ATTORNEYS No. 813,854. PATENTED FEB. 27, 1906.
H. BURLICH.
ROTARY ENGINE.
APPLICATION FILED JULY 28, 1905.
3 SHEETS—SHEET 2.
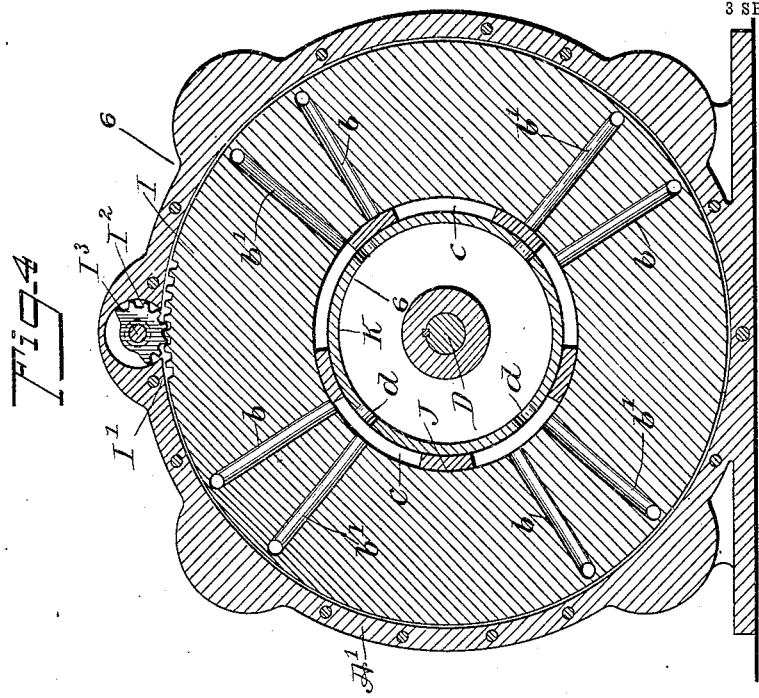
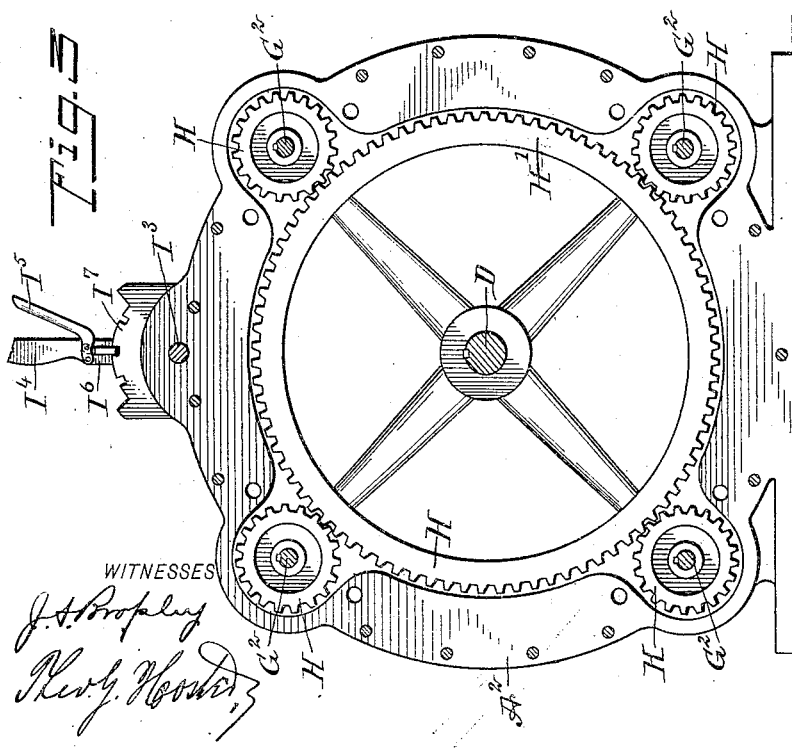
WITNESSES
INVENTOR
Henry Burlich
BY
ATTORNEYS No. 813,854. PATENTED FEB. 27, 1906.
H. BURLICH.
ROTARY ENGINE.
APPLICATION FILED JULY 28, 1905.
3 SHEETS—SHEET 3.
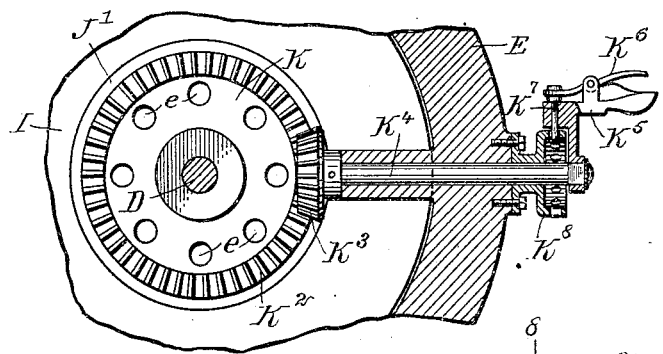
Fig. 5
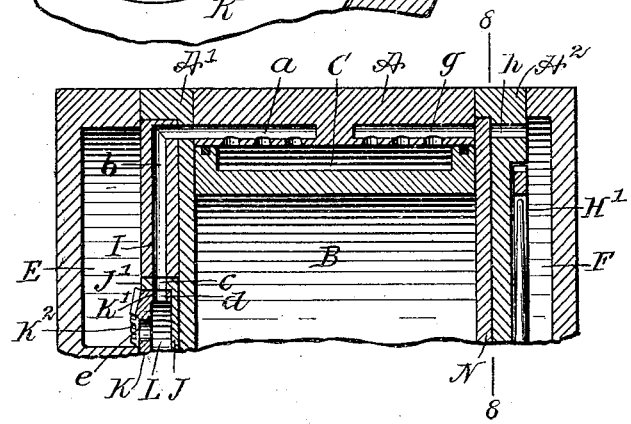
Fig. 6
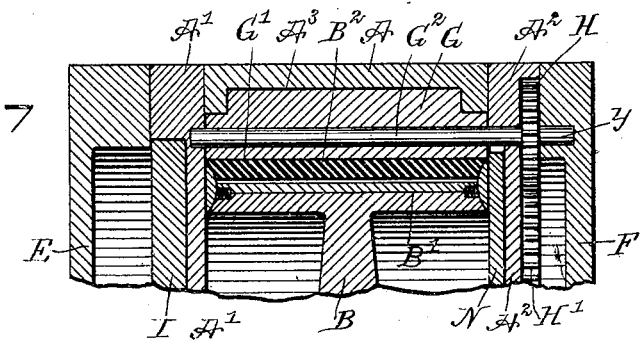
Fig. 7
Fig. 8
WITNESSES:
J. A. Brophy
Geo. G. Hosker
INVENTOR
Henry Burlich
BY
ATTORNEYS

UNITED STATES PATENT OFFICE.

HENRY BURLICH, OF NEW YORK, N. Y.

ROTARY ENGINE.

No. 813,854.      Specification of Letters Patent.      Patented Feb. 27, 1906.

Application filed July 28, 1905. Serial No. 271,682.

*To all whom it may concern:*

Be it known that I, HENRY BURLICH, a citizen of the United States, and a resident of New York city, borough of Manhattan, in the county and State of New York, have invented a new and Improved Rotary Engine, of which the following is a full, clear, and exact description.

The object of the invention is to provide a new and improved rotary engine arranged to permit convenient and quick reversing whenever desired and to allow of cutting off the motive agent at any desired point to utilize the motive agent expansively and to the fullest advantage.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a cross-section of the improvements on the line 1 1 of Fig. 2. Fig. 2 is a longitudinal central sectional elevation of the same on the line 2 2 of Fig. 1. Fig. 3 is a cross-section of the same on the line 3 3 of Fig. 2. Fig. 4 is a like view of the same on the line 4 4 of Fig. 2. Fig. 5 is an enlarged sectional end elevation of the improvements, showing more particularly the cut-off-valve mechanism. Fig. 6 is a longitudinal sectional elevation of the improvement on the line 6 6 of Fig. 4, showing more particularly the steam admission and exhaust. Fig. 7 is a like view of the same on the line 7 7 of Fig. 1 and showing more particularly one of the abutments and a registering rotor-head, and Fig. 8 is a transverse section of the improvement on the line 8 8 of Fig. 6.

In the cylinder A is mounted to rotate concentrically a rotor B, forming with the cylinder a working chamber C, and the peripheral face of the said rotor B is provided with heads or pistons B', traveling in the said working chamber C and having packings B² in contact with the inner surface of the cylinder A. The shaft D of the rotor is journaled in cylinder-heads A' and A², on which are secured the steam-chest E and the exhaust-chest F, respectively. In the wall of the cylinder A are formed recesses A³, intersecting the working chamber C and spaced equidistant apart, and in the said recesses A³ are mounted to turn cylindrical abutments G, extending into the working chamber C and in frictional contact with the rotor B, the said abutments G being preferably one less in number than the number of heads B' on the rotor B. Each of the abutments G is provided on its peripheral face with a cut-out portion G' for the passage of the rotor-heads B'. On the shafts G² of the abutments G are secured pinions H in mesh with a gear-wheel H', attached to the rotor-shaft D and extending within the exhaust-chest F. When the rotor B and its shaft D are rotated, then the gear-wheel H' and the pinions H impart a rotary motion to the abutments G to rotate the abutments and the rotor B at the same peripheral speed, it being understood that the rotor-heads B' register successively with the cut-out portions G' of the abutments G to allow the rotor-heads to pass from one side of the abutments to the other side thereof.

Into the working chamber C open sets of admission-ports *a a'*, arranged in the wall of the cylinder A on opposite sides of the recesses A³, containing the abutments G, so that the live motive agent can be admitted to either side of an abutment with a view to run the engine either in a forward or a backward direction. Thus when the motive agent passes through the port *a* into the working chamber C and acts on the piston-heads B' of the rotor B then the latter is rotated in the direction of the arrow *x*, (see Fig. 1;) but when the motive agent passes into the working chamber C by way of the port *a'* then the rotor B is rotated in the inverse direction of the arrow *x*. The ports *a* and *a'* are adapted to register with ports *b b'*, (see Figs. 5 and 6,) formed in the reversing-valve I, mounted to turn in the steam-chest E, and the said ports *b b'* are adapted to register with elongated openings *c*, formed in the rim J' of the admission-valve J, secured on the rotor-shaft D and likewise extending in the steam-chest E. The openings *c* are adapted to register with ports *d*, formed in the rim K' of the cut-off valve K, mounted to rotate loosely on the rotor-shaft D and likewise extending within the steam-chest E. The cut-off valve K forms with the admission-valve J an annular chamber L, connected by apertures *e*, formed in the web of the valve K with the interior of the steam-chest E, so that the live motive agent can pass by way of the said openings *e* into the chamber L and from the latter by way of the port *d* and openings *c* into the ports $b$ $b'$ and from the latter into either of the ports $a$ $a'$, according to which of the sets of ports $a$ $b$ or $a'$ $b'$ is in register at the time. Thus when the several parts are in the position shown in Fig. 6 the ports $b$ and $a$ are connected with each other, while the ports $b'$ and $a'$ are out of register, and hence the live motive agent passes through the ports $b$ and $a$ into the working chamber C to cause the rotor B to rotate in the direction of the arrow $x$. When the reversing-valve I is turned to move the ports $b$ and $a$ out of register with each other and the ports $b'$ and $a'$ into register with each other, then the live motive agent passes into the working chamber C to cause the rotor B to travel in the inverse direction of the arrow $x$. On the face of the cut-off valve K is secured or formed a bevel gear-wheel $K^2$, (see Fig. 5,) in mesh with a bevel-pinion $K^3$, secured on a shaft $K^4$, extending transversely and journaled in suitable bearings arranged on the steam-chest E. On the outer end of the shaft $K^4$ is secured a handle $K^5$, adapted to be taken hold of by the operator for turning the shaft $K^4$ and pinion $K^3$ with a view to rotate the bevel gear-wheel $K^2$, and consequently the cut-off valve K, to bring the ports $d$ sooner or later in register with the openings $c$ in the admission-valve J to cut off the motive agent correspondingly sooner or later. On the handle $K^5$ is fulcrumed a hand-lever $K^6$, carrying a locking-pin $K^7$, adapted to engage one of a series of apertures in a segment $K^8$, attached to the steam-chest E, so as to lock the handle $K^5$, and consequently the shaft $K^4$, after the cut-off valve has been moved into the desired cut-off position.

In order to reverse the engine, the reversing-valve I is turned, and for this purpose the reversing-valve is provided at its peripheral face with a segmental gear-wheel $I'$, in mesh with a segmental pinion $I^2$, secured on a shaft $I^3$, carrying at one outer end a handle $I^4$, provided with a spring-pressed hand-lever $I^5$, controlling a locking-pin $I^6$, adapted to engage a notched segment $I^7$ to lock the handle $I^4$, and consequently the shaft $I^3$, in the desired position. The shaft $I^3$ extends longitudinally in the steam-chest E, the cylinder A, cylinder-heads $A'$ $A^2$, and the exhaust-chest F, (see Fig. 2,) and this shaft $I^3$ also controls the exhaust-valve N, interposed between the head $A^2$ on the cylinder A and its rotor B and arranged in the form of a disk mounted to turn loosely on the shaft D. The exhaust-valve N is provided with sets of ports $f$ $f'$, adapted to register with ports $g$ $g'$, formed in the wall of the cylinder A and opening into the working chamber C on opposite sides of the corresponding abutments G. The ports $g$ $g'$ are in transverse alinement with the admission-ports $a$ $a'$, as plainly illustrated in Fig. 3, but are not in communication with each other. The ports $f$ $f'$ are adapted to register with ports $h$ $h'$, formed in the cylinder-head $A^2$ and opening into the exhaust-chest F, from which the exhaust-steam can pass to a suitable place of discharge by way of an exhaust-pipe $F'$. On the peripheral face of the exhaust-valve N (see Fig. 8) are formed gear-teeth $N'$, in mesh with a segmental pinion $I^8$, secured on the shaft $I^3$, so that when the latter is turned the said pinion $I^8$ turns the exhaust-valve N to bring either set of ports $f$ or $f'$ in register with the corresponding set of ports $g$ or $g'$.

From the foregoing it will be seen that when the reversing-valve I is turned by the operator manipulating the handle $I^4$ the exhaust-valve N turns with it. Now when the ports $a$ and $b$ are in register and the ports $a'$ and $b'$ are out of register the ports $f$ and $g$ are out of register, while the ports $f'$ and $g'$ are in register, and when the valves I and N are simultaneously reversed then the ports $a'$ and $b'$ and the ports $f$ and $g$ move into register, while the ports $a$ and $b$ and the ports $f'$ and $g'$ move out of register. In other words, the live steam passes into the working chamber C at one side of an abutment G and escapes or exhausts from the working chamber C at the other side of the same abutment.

The operation is as follows: When the several parts are in the position illustrated in the drawings and the ports $a$ and $b$ and $f'$ and $g'$ are in register with each other, then the live motive agent passes into the working chamber C by way of the port $a$ to act on the heads $B'$, and thereby turn the rotor B in the direction of the arrow $x$. By setting the cut-off valve K steam may be admitted sooner or later to the elongated openings $c$, and consequently more or less steam passes into the working chamber C during the time the head $B'$ travels from one abutment G to the next following one, it being understood that after the steam is cut off it works expansively against the corresponding piston-head $B'$, and when the latter has passed the next following port $g'$ the steam exhausts from the working chamber in the rear of the head B by way of the ports $g'$ $f'$ $h'$ into the exhaust-chest F. Now by having one more piston-head $B'$ than abutments G it is evident that always one of the heads $B'$ is acted on by the live motive agent under initial pressure, and hence a uniform powerful rotation is given to the rotor B and its shaft D, used for transmitting the rotary motion of the engine to other machinery.

By arranging the reversing-valve I and the cut-off valve K in the steam-chest E at one side of the cylinder A and its head $A'$ and having the exhaust-valve N arranged on the opposite side of the cylinder a very compact machine is produced, and convenient access can be had at any time to the said parts by removing either chest E or F.

Having thus described my invention, I claim as new and desire to secure by Letters Patent—

1. A rotary engine comprising a cylinder, a rotor mounted concentrically within the said cylinder and having a plurality of peripheral heads, rotary abutments mounted in the said cylinder and having cut-out portions for the passage of the said rotor-heads, the number of abutments being one less than the number of the said heads, and an admission, cut-off and reversing valve mechanism for controlling the steam to the cylinder at either side of each of the said abutments, arranged on one side of said rotor and an exhaust-valve on the opposite side of the same.

2. A rotary engine comprising a cylinder, a rotor mounted concentrically within the said cylinder and having a plurality of peripheral heads, rotary abutments mounted in the said cylinder and having cut-out portions for the passage of the said rotor-heads, and a valve mechanism for controlling the motive agent to the said cylinder and consisting of a ring-shaped reversing-valve having sets of ports adapted to register with ports formed in the cylinder and leading to the working space at opposite sides of each abutment, means for turning the said ring-shaped valve, to bring either port of a set of ports in register with the corresponding cylinder-port, a manually-controlled cut-off valve connected with a steam-supply, and an admission-valve interposed between the said reversing-valve and the said cut-off valve and rotating with the said rotor, the said admission-valve having in its rim elongated openings adapted to register with the ports in the said reversing-valve and the ports in the said cut-off valve.

3. A rotary engine comprising a cylinder, a rotor mounted concentrically therein and having a plurality of peripheral heads, the said rotor forming a working chamber with the said cylinder, abutments mounted to rotate in the said cylinder and in unison with the said rotor, each abutment having a cut-out portion for the passage of the said rotor-heads, a steam-chest on one end of the said cylinder and connected with a steam-supply, a manually-controlled cut-off valve mounted to turn in the said steam-chest and concentric with the said rotor, and an admission-valve rotating with the said rotor and having elongated openings adapted to register with ports in the rim of the said cut-off valve, the said elongated openings of the admission-valve being also adapted to register with ports leading into the working chamber.

4. A rotary engine comprising a cylinder, a rotor mounted concentrically therein and having a plurality of peripheral heads, the said rotor forming a working chamber with the said cylinder, abutments mounted to rotate in the said cylinder and in unison with the said rotor, each abutment having a cut-out portion for the passage of the said rotor-heads, a steam-chest on one end of the said cylinder and connected with a steam-supply, a manually-controlled cut-off valve mounted to turn in the said steam-chest and concentric with the said rotor, an admission-valve rotating with the said rotor and having elongated openings adapted to register with ports in the rim of the said cut-off valve, and a manually-controlled reversing-valve mounted to turn in the said steam-chest and having sets of admission-ports adapted to register with the said elongated openings and with sets of ports leading into the working chamber at opposite sides of the said abutments.

5. A rotary engine comprising a cylinder, a rotor mounted concentrically therein and having a plurality of peripheral heads, the said rotor forming a working chamber with the said cylinder, abutments mounted to rotate in the said cylinder and in unison with the said rotor, each abutment having a cut-out portion for the passage of the said rotor-heads, a steam-chest on one end of the said cylinder and connected with a steam-supply, a manually-controlled cut-off valve mounted to turn in the said steam-chest and concentric with the said rotor, an admission-valve rotating with the said rotor and having elongated openings adapted to register with ports in the rim of the said cut-off valve, a manually-controlled reversing-valve mounted to turn in the said steam-chest and having sets of admission-ports adapted to register with the said elongated openings and with sets of ports leading into the working chamber at opposite sides of the said abutments, and an exhaust-valve having sets of exhaust-ports opening into the said working chamber at opposite sides of the abutments, the said exhaust-valve turning with the said reversing-valve.

6. A rotary engine comprising a cylinder, a rotor mounted concentrically therein and having a plurality of peripheral heads, the said rotor forming a working chamber with the said cylinder, abutments mounted to rotate in the said cylinder and in unison with the said rotor, each abutment having a cut-out portion for the passage of the said rotor-heads, a steam-chest on one end of the said cylinder and connected with a steam-supply, a manually-controlled cut-off valve mounted to turn in the said steam-chest and concentric with the said rotor, an admission-valve rotating with the said rotor and having elongated openings adapted to register with ports in the rim of the said cut-off valve, a manually-controlled reversing-valve mounted to turn in the said steam-chest and having sets of admission-ports adapted to register with the said elongated openings and with sets of ports leading into the working chamber at opposite sides of the said abutments, an exhaust-valve having sets of exhaust-ports opening into the said working chamber at opposite sides of the abutments, the said exhaust-valve turning with the said reversing-valve, and an exhaust-chamber at the end of the cylinder opposite the one having the said steam-chest, the said ports in the exhaust-valve opening into the said exhaust-chamber.

7. A rotary engine comprising a cylinder, a rotor mounted concentrically therein and having a plurality of peripheral heads, the said rotor forming a working chamber with the said cylinder, abutments mounted to rotate in the said cylinder and in unison with the said rotor, each abutment having a cut-out portion for the passage of the said rotor-heads, a steam-chest on one end of the said cylinder and connected with a steam-supply, a manually-controlled cut-off valve mounted to turn in the said steam-chest and concentric with the said rotor, an admission-valve rotating with the said rotor and having elongated openings adapted to register with ports in the rim of the said cut-off valve, a manually-controlled reversing-valve mounted to turn in the said steam-chest and having sets of admission-ports adapted to register with the said elongated openings and with sets of ports leading into the working chamber at opposite sides of the said abutments, an exhaust-valve having sets of exhaust-ports opening into the said working chamber at opposite sides of the abutments, the said exhaust-valve turning with the said reversing-valve, an exhaust-chamber at the end of the cylinder opposite the one having the said steam-chest, the said ports in the exhaust-valve opening into the said exhaust-chamber, and gearing in the said exhaust-chamber and connecting the said rotor with the said abutments.

In testimony whereof I have signed my name to this specification in the presence of two subscribing witnesses.

HENRY BURLICH.

Witnesses:
   THEO. G. HOSTER, Jr.,
   EVERARD B. MARSHALL.